United States Patent [19]
Cleary et al.

[11] 3,915,828
[45] Oct. 28, 1975

[54] SOLID ELECTROLYTE CELL ASSEMBLY

[75] Inventors: James G. Cleary; Leonard Elikan, both of Pittsburgh, Pa.

[73] Assignee: Westinghouse Electric Corporation, Pittsburgh, Pa.

[22] Filed: Dec. 6, 1973

[21] Appl. No.: 422,478

[52] U.S. Cl. ............................................. 204/195 S
[51] Int. Cl. ........................................... G01n 27/46
[58] Field of Search ......................... 204/1 T, 195 S

[56] References Cited
UNITED STATES PATENTS
3,546,086   12/1970   Sayles ............................. 204/195 S FOREIGN PATENTS OR APPLICATIONS
1,511,066   12/1967   France ............................. 204/195 S

*Primary Examiner*—T. Tung
*Attorney, Agent, or Firm*—M. P. Lynch

[57]   ABSTRACT

A tubular solid electrochemical cell assembly having electrodes disposed on the inner and outer surfaces is positioned in a snugly fitting relationship within a tubular metal housing having apertures therethrough to permit gas flow through the apertures for contacting the electrode disposed on the outer surface of the tubular solid electrolyte.

3 Claims, 2 Drawing Figures

SOLID ELECTROLYTE CELL ASSEMBLY

BACKGROUND OF THE INVENTION

The ionic conductivity of solid electrolyte material has served as a basis for the development of numerous gas analyzing devices incorporating solid electrolyte electrochemical cells for generating electrical indications of gas constituents of liquid metals, stack gases, etc. Of particular significance has been the oxygen an ion conductivity characteristics of solid electrolyte materials including zirconia and thoria. The oxygen ion conductivity characteristics of these electrolyte materials as well as others is described in detail in U.S. Pat. No. 3,400,054 issued Sept. 3, 1968. The utilization of an oxygen ion conductive solid electrolyte electrochemical cell in an industrial process is described in U.S. Pat. No. 3,404,836 issued Oct. 8, 1968. While the oxygen ion conductivity characteristics of some solid electrolyte materials renders the electrolyte material useful in gas monitoring applications, the practical embodiment of the solid electrolyte in an operating device has posed problems relative to hermetical sealing of the solid electrolyte to supporting structures of dissimilar material compositions such as metal fragile ceramic. Inasmuch as typical solid electrolyte electrochemical cell devices for gas monitoring require isolation of an oxygen reference media contacting one surface of the solid electrolyte from a gas environment to be monitored which contacts the opposite surface of the electrolyte, the sealing of the solid electrolyte within a gas monitoring is a critical requirement.

Generally the electrochemical cell is affixed to a metal supporting tube which in turn is secured within the housing of a gas analyzer. Due to the dissimilar material composition of the ceramic and the metal tube the bonding of the ceramic solid electrolyte electrochemical cell to the metal tube is a major consideration in fabrication of the gas analyzer. The bonding processes presently utilized are highly specialized.

SUMMARY OF THE INVENTION

There is described herein with reference to the accompanying drawings a technique for mechanically coupling a solid electrolyte electrochemical cell to a supporting structure of dissimilar material, i.e., metal, without employing metal to ceramic bonding or brazing techniques. A tubular solid electrolyte electrochemical cell is positioned within a tubular supporting structure in a snugly fitting relationship. Apertures in the wall of the tubular support structure permit gas to contact one surface of the solid electrolyte electrochemical cell while the opposite surface of the solid electrolyte electrochemical cell is exposed to an oxygen reference gas environment introduced within the tubular housing. The concept provides for a direct mechanical seal between the solid electrolyte electrochemical cell and the supporting structure thus eliminating the requirement for highly specialized bonding or brazing techniques.

Furthermore the use of flowing oxygen reference gas functions to clear away any gas introduced due to leaks from the environment under analysis. The combination of the snug fit relationship between the electrochemical cell and the support structure and the flowing reference gas succeeds in providing the necessary isolations between the environment under analysis and the oxygen reference media.

DESCRIPTION OF THE DRAWING

The invention will become more apparent from the following exemplary description in connection with the accompanying drawing.

DESCRIPTION OF THE PREFERRED EMBODIMENT

Figure 1:
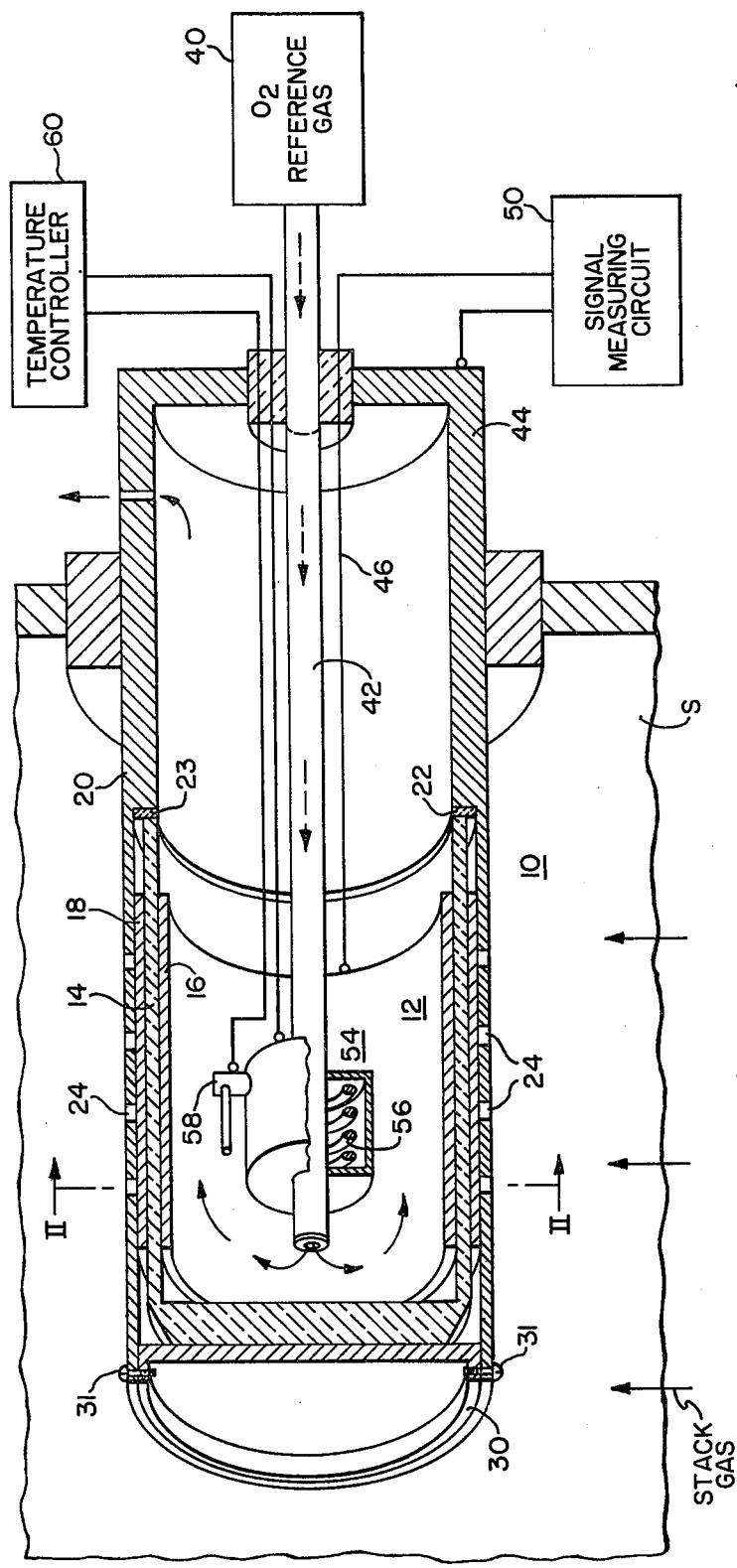
FIG. 1 is a schematic illustration in partial section of the embodiment of the invention and FIG. 2 is a section illustration of the embodiment of FIG. 1.

Referring to FIG. 1 there is illustrated an embodiment of the invention in the form of a gas probe assembly 10 inserted within the wall of stacks to monitor gas constituents within a gas being discharged through the stacks. For the purposes of discussion it will be assumed that the gas of interest is oxygen and that the solid electrolyte incorporated in the probe assembly 10 is such as to support oxygen ion conductivity in accordance with the materials and teaching disclosed in the above identified U.S. Patents.

The tubular electrochemical cell 12 consists of the tubular solid electrolyte 14, inner electrode 16 disposed in contact with the inner surface of the tubular solid electrolyte and outer electrode 18 disposed on the opposite surface of the solid electrolyte. Typical material composition for the solid electrolyte electrochemical cell for monitoring oxygen consists of a zirconia solid electrolyte and platinum electrodes. The tubular electrochemical cell 12 is inserted by manual pressure within a tubular housing 20 in a press fit relationship therewith and in supporting contact with an internal shoulder 22 of the housing 20. A high temperature asbestos gasket 23 is positioned on the shoulder 22. Apertures 24 in the portion of the wall of the housing 20 contacting the electrode 18 provide direct exposure of the electrode 18 to the gas environment within the stack S. The mechanical seal established between the tubular electrochemical cell 12 and the housing 20 provided by the press fit relationship effectively prevents the stack gas from contacting the inner electrode 16. Additional assurance of maintaining a mechanically sealed relationship between the tubular electrochemical cell 12 and the housing 20 can be provided by inserting an end cap 30 within an open end of the tubular housing 20 in a press fit relationship therewith for contacting the end of the tubular cell 12 to maintain the cell 12 in contact with the shoulder 22.

The end cap 30 may be a metal which is capable of being brazed or welded to the tubular housing 20. Alternatively the end cap 30 could be held in position by set screws 31 extending through the tubular housing 20.

It is apparent that if the end cap is not to be used, the solid electrolyte 14 would necessarily be in the form of a tubular member having a closed end as illustrated in FIG. 1 to prevent passages of the stack gas within the tubular electrolyte member. If however the end cap is to be used, the solid electrolyte 14 need not have a closed end inasmuch as the end cap will serve the purpose of preventing stack gas from entering the tubular electrolyte.

In addition to closing the end of the tubular assembly, the end surface of a closed end solid electrolyte member on the surface of the end cap 30 in the event of an open end solid electrolyte member functions to divert the flow of the oxygen reference gas introduced from an oxygen reference source 40 across the surface of the inner electrode 16. The oxygen reference gas flow pattern established by the gas entry tube 42 which directs the incoming oxygen reference gas against the closed end surface not only establishes an oxygen reference at the inner electrode 16 but also serves to clear away any stack gas which may be present at the electrode 16 due to leaks.

In accordance with the accepted operation of a solid electrolyte electrochemical cell as a device for generating an electrical signal indicative of the oxygen content of a gas, the electrochemical cell 12 generates an electrical signal which is a function of the difference between the oxygen partial pressure of the stack gas and the oxygen partial pressure of the reference gas. The electrical signal developed between electrodes 16 and 18 in response to oxygen ion migration is transmitted by electrical leads 44 and 46 to signal measuring circuit 50. In the event the tubular housing 20 is constructed from electrical conductive material such as metal, the wall of the tubular housing 20 can serve as an electrical conductor in contact with the electrode 18.

As noted in the above identified U.S. Patents, the electrical signal produced by the solid electrolyte electrochemical cell is temperature dependent. Therefore in order to permit clear interpretation of electrical signals as an indication of the oxygen present in the stack gas, it is necessary to maintain the temperature of the tubular electrochemical cell 12 at a constant level. In the embodiment of FIG. 1 the cell temperature is maintained by a heater assembly 54 consisting of heater element 56 and temperature measuring device 58 which are operatively connected to a temperature controller 60. This heater assembly is described in detail in U.S. Pat. 3,546,086 entitled Device for Oxygen Measurement issued October 30, 1968.

Figure 2:
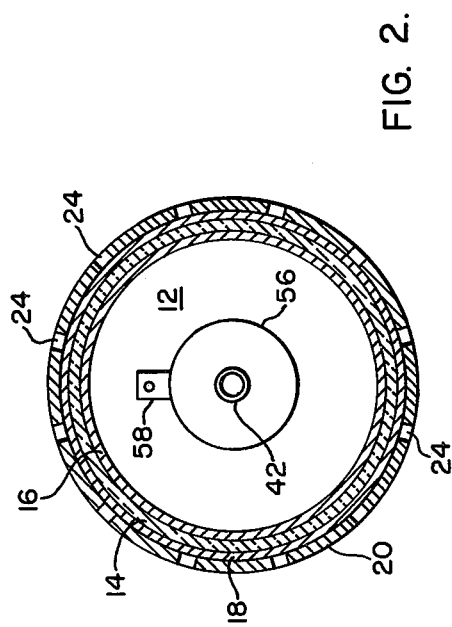

The sectioned view of the probe assembly of FIG. 1 illustrated in FIG. 2 clearly depicts the realtionship of the tubular electrochemical cell 12 and the tubular housing 20.

We claim:

1. An assembly comprising, an electrochemical cell including a tubular solid electrolyte member having a first electrode in contact with the inner surface of said tubular solid electrolyte member and a second electrode in contact with the outer surface of said tubular solid electrolyte member, and an open ended tubular housing receiving said electrochemical cell in a press fit relationship to establish a mechanical sealing contact between the second electrode and the inner surface of said tubular housing, the portion of the wall of said tubular housing opposite said second electrode having apertures therethrough, said mechanical sealing contact preventing gas which contacts the surface of the second electrode exposed by said apertures from contacting said first electrode.

2. An assembly as claimed in claim 1 wherein said tubular solid electrolyte member has at least one open end, and said tubular housing includes an internal shoulder and a sealing means associated therewith receiving an open end of said tubular solid electrolyte member in a sealing relationship.

3. An assembly as claimed in claim 2 further including means connected to said tubular housing in contact with the end of said tubular solid electrolyte member opposite said open end to maintain said open end in sealing contact with said sealing means.

* * * * *